United States Patent [19]

Shiramizu et al.

[11] Patent Number: 5,475,844
[45] Date of Patent: Dec. 12, 1995

[54] HEAVILY LOADED RESOURCE EVALUATION SYSTEM

[75] Inventors: Akira Shiramizu; Takashi Nishiuchi, both of Tokyo, Japan

[73] Assignee: NEC Corporation, Tokyo, Japan

[21] Appl. No.: 155,815

[22] Filed: Nov. 23, 1993

[30] Foreign Application Priority Data

Nov. 27, 1992 [JP] Japan .................................. 4-341236

[51] Int. Cl.6 .................................................. G06F 17/00
[52] U.S. Cl. ................... 395/700; 364/DIG. 1; 364/281.6
[58] Field of Search ..................................... 395/600, 700

[56] References Cited

U.S. PATENT DOCUMENTS 3,913,070  10/1975  Malcolm et al. .................. 364/DIG. 1
5,307,496   4/1994  Ichinose et al. .................. 364/DIG. 1

OTHER PUBLICATIONS

"Application System/400 Programming: Performance Tools/Guide Version 2", Chapters 6, 8 and 11 (1991).

Primary Examiner—Thomas M. Heckler
Attorney, Agent, or Firm—Foley & Lardner

[57] ABSTRACT

A system and method for evaluating resource utilization are provided. The utilization of each subsystem can then be displayed in a manner enabling a user to easily evaluate performance evaluation. The present invention determines whether any of the resources constituting a computer system are subject to a heavy load by entering system management facility records and comparing them with preset threshold values for resource utilization ratios. The job or resource which has subjected this resource to a heavy load is then identified as the bottleneck. The result is presented to the user via a graphical display.

18 Claims, 8 Drawing Sheets

| DISK NAME | NO. OF MSP'S | MSP ID 1 | ----- | MSP ID n | |
|---|---|---|---|---|---|
| | NO. OF FILES | FILENAME1 | ----- | FILENAME n | |
| ⋮ | | | | | |

FIG. 3

| RESOURCE NAME | CPU | MEMORY | | DISK | MSP |
|---|---|---|---|---|---|
| VALUE | UTILIZATION RATIO | PAGE FAULT COUNT | | I/O COUNT | I/O COUNT |
| UNIT | % | /SEC | | /SEC | /SEC |
| CATEGORY | ----- | SYSTEM | USER | ----- | ----- |
| ALARM VALUE | 50 | 6 | n | 10 | 30 |
| LIMIT VALUE | 75 | 10 | 2*n | 15 | 50 |

FIG. 4

| RECORD ID | SAMPLING TIME | POSITION OF DETAIL PART 1 | SIZE OF DETAIL PART 1 | POSITION OF DETAIL PART 2 | SIZE OF DETAIL PART 2 | NUMBER OF DETAIL PART 2 |
|---|---|---|---|---|---|---|

OUTLINE PART

| DETAIL PART 1 | DETAIL PART 2 | ----- | DETAIL PART 2 |
|---|---|---|---|

DETAIL PART

```
------ CPU ACTIVITY REPORT ------
DATE:92/06/08  FROM:08:30  TO:22:10

0   10  20  30  40  50  60  70  80  90  100(%)
             ---------------------------------------------
13:00-13:10  SSSSSSSSSSSSSSSSSSSSSSSSSWWWWWWWWWWWWOOOOOOOOOOOO  100
   RFDX      ********                                            18
   SORTNP    *******                                             16
   PMRA210   *****                                               10
   PMEA010   *****                                               10
   ZCA0403   *****                                               10
13:30-13:40  SSSSSSSSSSSSSSSSSSSSSSSSSWWWWWWWWWWWWOOOOOOOOOOOO   98
   DDSORT    ********                                            18
   PMEA222   *****                                               10
   PMEA310   ****                                                 8
   PMEA410   ****                                                 8
   ZCA0443   ****                                                 8
14:20-14:30  SSSSSSSSSSSSSSSSSSSSSSSSSWWWWWWWWWWWWOOOOOOOOOOOO   98
   PMEA333   ******                                              12
   PMEA467   ******                                              12
   PMEA500   *****                                               10
   PMEA510   *****                                               10
   ZGF8550   ****                                                 8
14:30-14:40  SSSSSSSSSSSSSSSSSSSSSSSSSWWWWWWWWWWWWOOOOOOOOOOOO   98
   PMEA333   ******                                              12
   PMEA467   ******                                              12
   TSG0560   ****                                                 8
   ZGF8550   ****                                                 8
   ZGF9000   ****                                                 8
16:50-17:00  SSSSSSSSSSSSSSSSSSSSSSSSSWWWWWWWWWWWWOOOOOOOOOOOO   98
   VCFA050   ******                                              14
   USC0200   ******                                              12
   ZHA0320   *****                                               10
   ZSS0050   *****                                               10
   ZZZ9780   ***                                                  6
```

HEAVILY LOADED RESOURCE EVALUATION SYSTEM

DETAILED DESCRIPTION OF THE INVENTION

The present invention relates to a heavily loaded resource evaluation system for use in the operation management of computer systems.

BACKGROUND OF THE INVENTION

In a system management facility file, a program group having a system monitoring facility, which is a subsystem to an operating system, records at regular intervals how each of the resources constituting a computer system is utilized as a system resource utilization record, and further records at regular intervals the execution hysteresis of each of the jobs executed on said system as a job activity record. These records are stored in a sequential organization file form in a time series.

One of the techniques to analyze the operation of a computer system by inputting data on such a system management facility file is described in a user manual entitled "Application System/400 Programming: Performance Tools/Guide Version 2".

"Chapter 6. Displaying Performance Data" and "Chapter 8. Printing Performance Reports" of this manual explain the function of performance tools to totalize by any partitioning unit the data in the system management facility file recorded by the operating system during the operation of the computer system, and to edit and output those data. Its "Chapter 11. Capacity Planning and Performance Prediction" presents the threshold value, which is the value to be referred to by the user for performance evaluation in evaluating the edited output data from the performance tools.

However, the performance tools, though able to edit and output the data in the system management facility file in any desired form, cannot edit and output for presentation to the user the results of performance analysis/evaluation by referring to the threshold value. Accordingly, there is the problem that the performance tools cannot reveal the results of performance analysis/evaluation, i.e. cannot identify the resource under heavy load during the operation of the system or the bottleneck which subjected that resource to the heavy load.

An object of the present invention is to enable any user, even if not well versed in performance evaluation procedures, to carry out performance evaluation readily and reliably.

SUMMARY OF THE INVENTION

A heavily loaded resource evaluation system according to a first aspect of the invention has the following configuration.

In a system management facility file, the status of utilization of each of the resources constituting a computer system is recorded at regular intervals as a system resource utilization record, and further the execution hysteresis of each of the jobs executed on said computer system is recorded at regular intervals as a job activity record.

In a system configuration file, information on connective relationship between a disk which is a constituent element of said computer system and a mass storage processor (MSP) for controlling this disk and information on the names of files stored on this disk are stored as system configuration data.

A system management facility record input program inputs each of the records in said system management facility file.

In a resource utilization ratio threshold value file, the alarm value and limit value, within the performance guarantee, for the utilization ratio of each of the resources constituting said computer system are stored as threshold values of the resource utilization ratio.

A heavily loaded resource selection program compares information on the resource utilization ratios in said system resource utilization record entered by said system management facility record input program with the limit value for the utilization ratio threshold values in this resource utilization ratio threshold value file, and extracts the resource name, recorded time and resource utilization ratio in said system resource utilization record indicating a heavily loaded status of utilization surpassing this limit value.

A heavily loaded resource information record generation program, after actuating said system management facility record input program and the heavily loaded resource selection program, extracts the recorded time of said system resource utilization record, extracted by the heavily loaded resource selection program; the job name in the job activity record entered by said system management facility record input program, recorded at said time; other resource names in the system resource utilization record entered by said system management facility record input program; and information on the resource utilization ratio. The heavily loaded resource information record generation program further refers to system configuration data in said system configuration file, and generates a single heavily loaded resource information record by integrating information on each resource and information on jobs using the resource in a correlated manner or integrating information on each resource and information on resources constituting that resource in a correlated manner.

In a heavily loaded resource information file, the heavily loaded resource information record generated by the heavily loaded resource information record generation program is stored.

A heavily loaded resource evaluation system according to a second aspect of the invention further has the following configuration in the heavily loaded resource evaluation system according to the first aspect of the invention.

The resource utilization ratio threshold values in said resource utilization ratio threshold value file consist of preset alarm values and limit values, within the performance guarantee, for the CPU utilization ratio, 10 the page fault count of a memory, and the disk and MSP input/output (I/O) counts.

A heavily loaded resource evaluation system according to a third aspect of the invention further has the following configuration in the heavily loaded resource evaluation system according to the first aspect of the invention.

The heavily loaded resource information record in said heavily loaded resource information file consists of an outline part and detail parts. The outline part further consists of a record ID indicating CPU information, memory information, disk information or MSP information; a sampling time; the positions of the detail parts; and the sizes of the detail parts. The detail parts further consist of the overall CPU utilization ratio and the CPU utilization ratio for each job if the record ID indicates CPU information; the overall page fault count and the page fault count for each job if the record ID indicates memory information; the overall disk I/O count and the I/O count for each file in the disk if the record ID indicates disk information; and the overall MSP I/O count and the I/O count of each disk connected to the MSP if the record ID indicates MSP information.

A heavily loaded resource evaluation system according to a fourth aspect of the invention further has the following configuration in the heavily loaded resource evaluation system according to the first aspect of the invention.

A heavily loaded resource determination result output program inputs a heavily loaded resource information record stored in said heavily loaded resource information file, and graphically displays it on an output unit.

A heavily loaded resource evaluation system according to a fifth aspect of the invention further has the following configuration in the heavily loaded resource evaluation system according to the first aspect of the invention.

The graph displayed by the heavily loaded resource determination result output program is structured so that it shows, besides the utilization ratios of resources, one at each recording time, represented in different characters with the alarm value and the limit value among said resource utilization ratio threshold values as the boundary, the resource utilization ratio for each job using each resource at said recording time, or the I/O counts of each file and each disk, being arranged together.

BRIEF DESCRIPTION OF THE DRAWINGS

The above-mentioned and other features, actions and advantages of the present invention will become more apparent from the following detailed description when taken in conjunction with the accompanying drawings, wherein.

In the drawings, the same reference numerals denote respectively the same constituent elements.

DETAILED DESCRIPTION OF THE PREFERRED EMBODIMENTS

Figure 1:
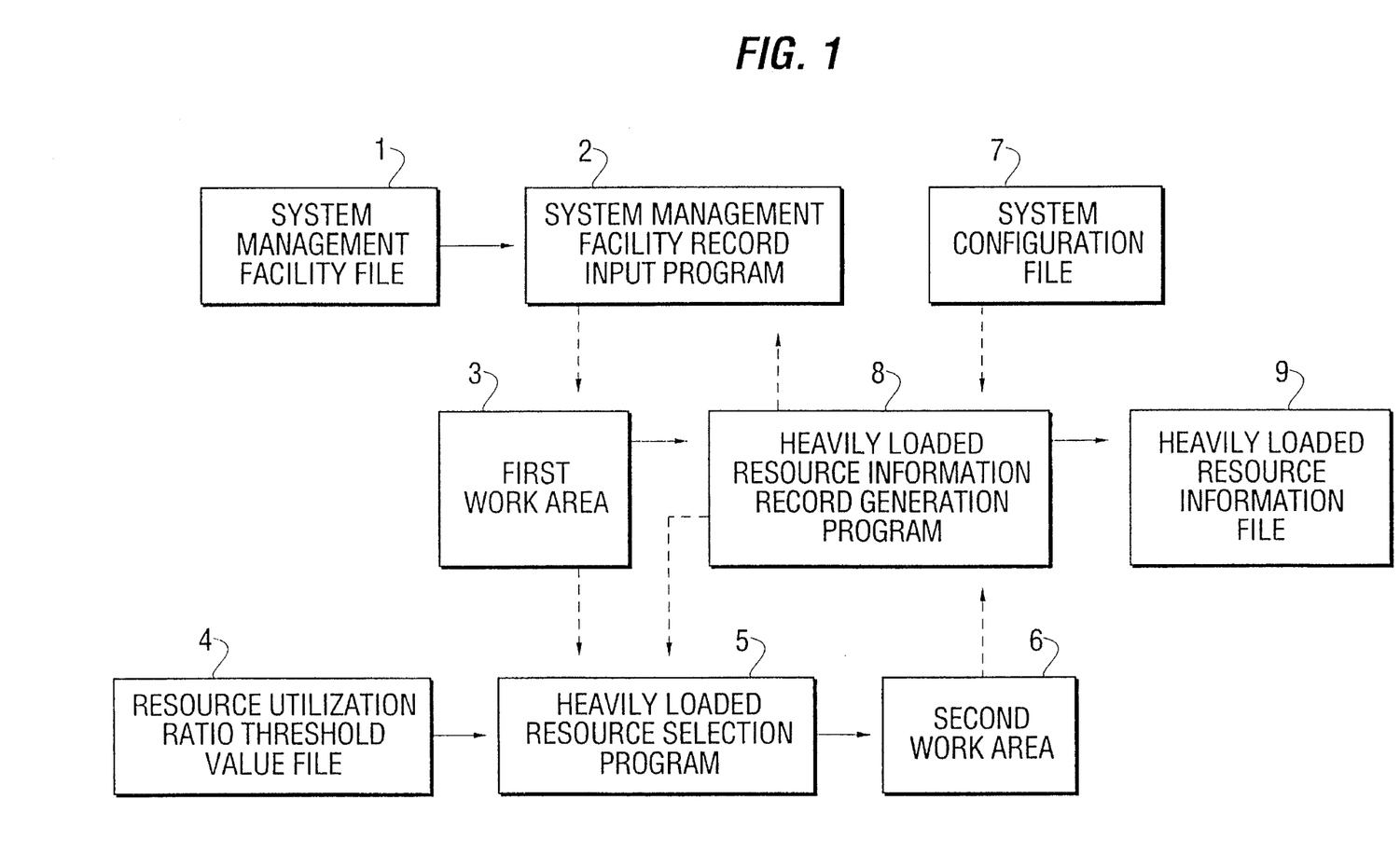
FIG. 1 is a block diagram illustrating a first preferred embodiment of the invention.

Referring to FIG. 1, a heavily loaded resource evaluation system, which is a first preferred embodiment of the present invention has the following configuration.

In a system management facility file 1, system resource utilization records, in which the status of utilization of each of the resources constituting a computer system is recorded at regular intervals, and job activity records, in which the execution hysteresis of each of the jobs executed on said computer system is recorded, are registered.

In a system configuration file 7, information on connective relationship between a disk, which is a constituent element of the computer system, and a mass storage processor (MSP) for controlling this disk and information on the names of files stored on the disk are stored as system configuration data.

A system management facility record input program 2 inputs each of the records in the system management facility file 1.

In a first work area 3 is stored each of the records in the system management facility file 1 entered by the system management facility record input program 2.

In a resource utilization ratio threshold value file 4, the alarm value and limit value, within the performance guarantee, for the utilization ratio of each of the resources constituting the computer system, i.e. the utilization ratio of the CPU, the page fault count of the memory, and the I/O counts of the disk and the MSP, are stored as threshold values of the resource utilization ratio.

A heavily loaded resource selection program 5 compares information on the resource utilization ratios in the system resource utilization record stored in the first work area 3 with the limit value for the utilization ratio threshold values in the resource utilization ratio threshold value file 4. The heavily loaded resource selection program 5 then extracts the resource name and recorded time in the system resource utilization record indicating a heavily loaded status of utilization surpassing this limit value.

In a second work area 6 are stored the resource name, recorded time and resource utilization in the system resource utilization record indicating the heavily loaded status of utilization, extracted by the heavily loaded resource selection program 5.

A heavily loaded resource information record generation program 8, after actuating the system management facility record input program 2 and the heavily loaded resource selection program 5, extracts from the first work area 3 the recorded time of the system resource utilization record, stored in the second work area 6; the job name in the job activity record entered by the system management facility record input program 2, recorded at that time; resource names in the system resource utilization record entered by the system management facility record input program 2; and information on the resource utilization ratio. The heavily loaded resource information record generation program 8 further refers to system configuration data in the system configuration file 7, and generates a single heavily loaded resource information record consisting of an outline part and detail parts. The outline part of this heavily loaded resource information record further consists of a record ID indicating CPU information, memory information, disk information or MSP information; a sampling time; the positions of the detail parts; and the sizes of the detail parts, while the detail parts further consist of the overall CPU utilization ratio and the CPU utilization ratio for each job if the record ID indicates CPU information; the overall page fault count and the page fault count for each job if the record ID indicates memory information; the overall disk I/O count and the I/O count for each file in the disk if the record ID indicates disk information; and the overall MSP I/O count and the I/O count of each disk connected to the MSP if the record ID indicates MSP information.

In a heavily loaded resource information file 9 is stored the heavily loaded resource information record generated by the heavily loaded resource information record generation program 8.

Figure 2:
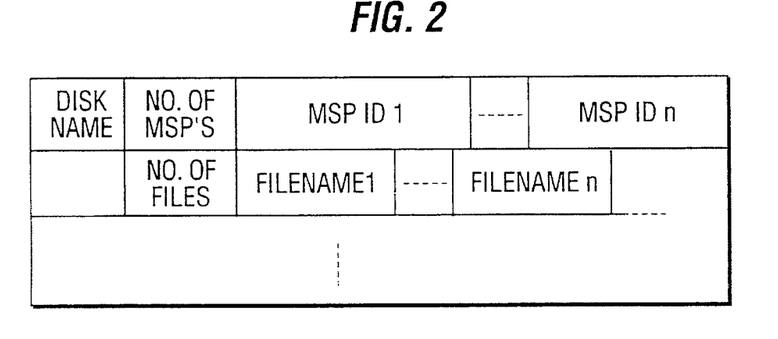
FIG. 2 is a diagram showing an example of system configuration data in the system configuration file 7 of the first preferred embodiment of the invention.

The system configuration file 7 illustrated in FIG. 2 has the following configuration.

System configuration data in the system configuration file 7 are information resulting from the disk-by-disk editing of the system configuration information held by the computer system and storing into the file prior to the actuation of the heavily loaded resource evaluation system, and include the number and unit identification names of the MSP's to which the pertinent disk is connected and the number and names of files set in that disk.

Next will be described in detail the operations of the first preferred embodiment of the present invention with reference to FIGS. 1 through 7.

First the user actuates the heavily loaded resource evaluation system, indicating a "section for evaluation" parameter and providing "evaluation start time-evaluation end time" information.

The heavily loaded resource evaluation system actuates the heavily loaded resource information record generation program 8, using the "section for evaluation" parameter.

Figure 6:
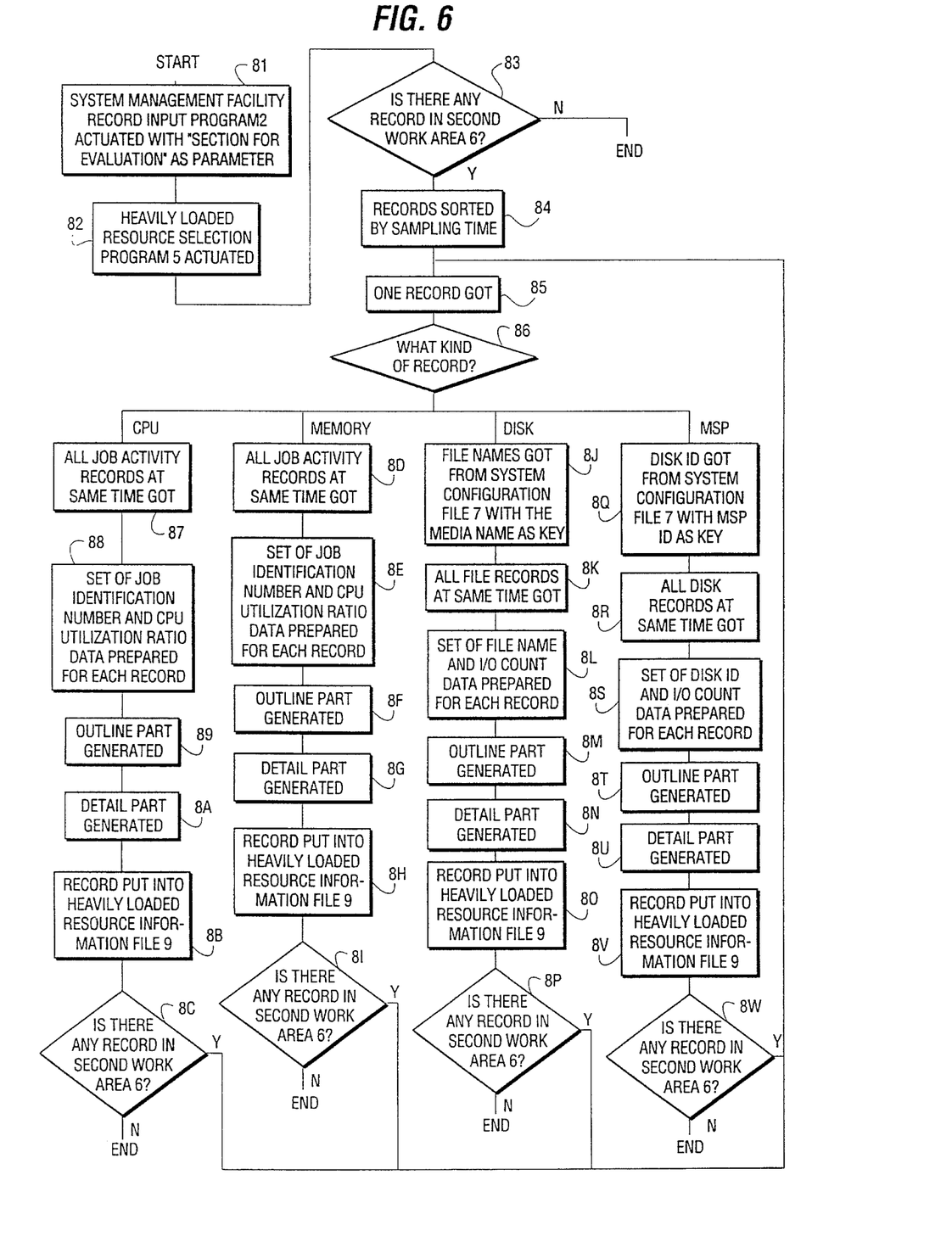
FIG. 6 is a flow chart showing the processing of the heavily loaded resource information record generation program 8 of the first embodiment of the invention.

The heavily loaded resource information record generation program 8 first actuates the system management facility record input program 2, using the "section for evaluation" parameter (step 81, FIG. 6).

Figure 5:
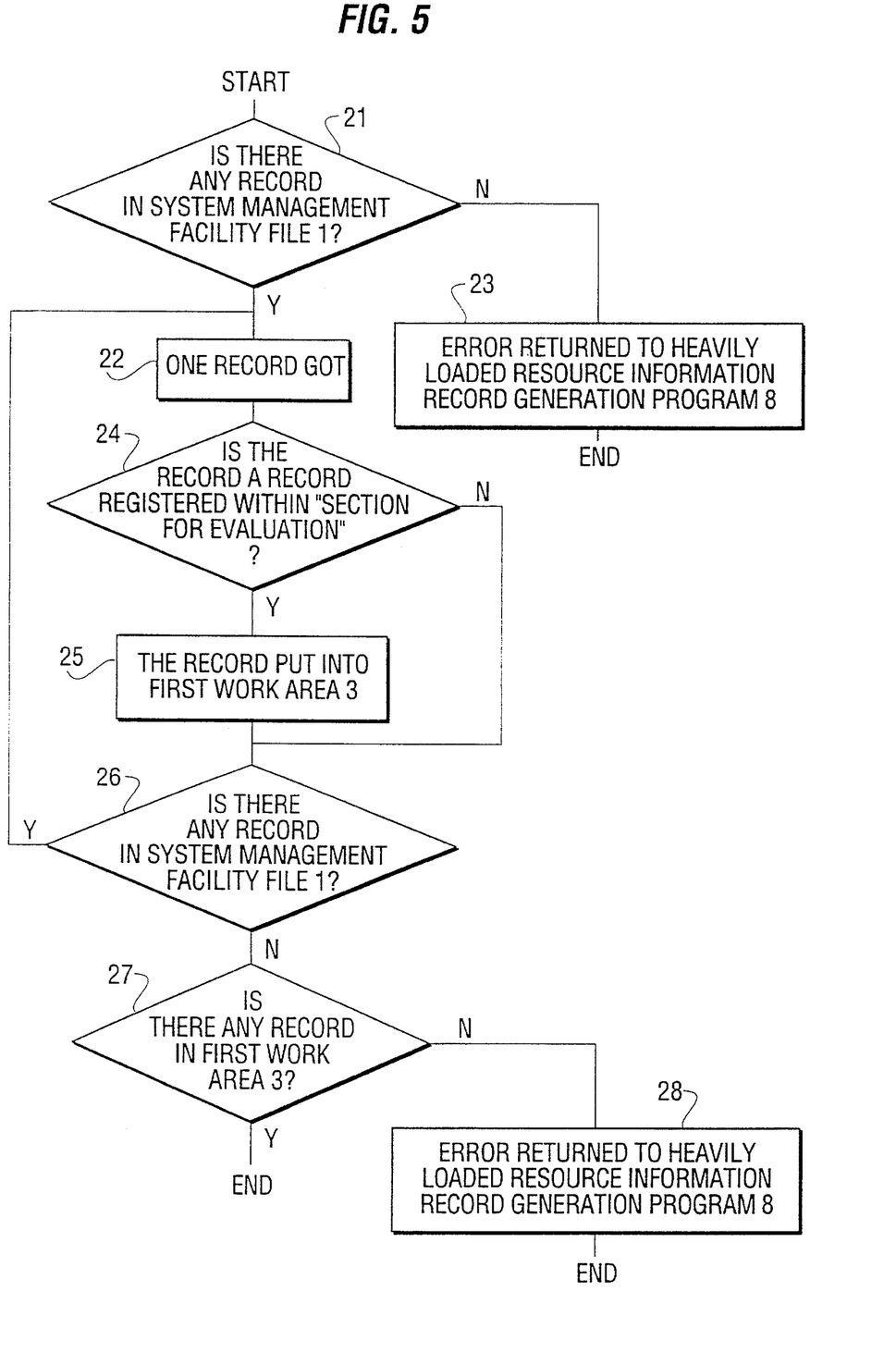
FIG. 5 is a flow chart showing the processing of the system management facility record input program 2 of the first embodiment of the invention.

The system management facility record input program 2 first determines whether or not there is any record in the system management facility file 1 (step 21, FIG. 5). The system management facility record input program 2, if the presence of any record is determined at step 21, will get one record (step 22) or, if the presence of no record is determined, will return an error to the heavily loaded resource information record generation program 8 (step 23).

Next, the system management facility record input program 2 determines whether or not the record got at step 22 is a record registered within the "section for evaluation" received from the heavily loaded resource information record generation program 8 (step 24). The system management facility record input program 2, if it determines at step 24 that the record got at step 22 is a record registered within the "section for evaluation", will put the record into the first work area 3 (step 25).

The system management facility record input program 2, after the completion of step 25, determines whether or not any record is remaining in the system management facility file 1 (step 26). The system management facility record input program 2, if it determines the presence of any remaining record at step 26, will return to step 22.

The system management facility record input program 2, if it determines at step 24 that the record is not a record registered within the "section for evaluation", will go on to step 26.

The system management facility record input program 2, if it determines at step 26 that any unevaluated record is no longer remaining in the system management facility file 1, will determine whether or not there is any record in the first work area 3 (step 27).

The system management facility record input program 2, if it determines at step 27 that there is no record in the first work area 3, will return to the heavily loaded resource information record generation program 8 an error that, in the system management facility file 1, there is no record registered within the "section for evaluation" (step 28). This error is further returned from the heavily loaded resource information record generation program 8 to the heavily loaded resource evaluation system, and the user is requested to redesignate a "section for evaluation".

The system management facility record input program 2, if it determines at step 27 the presence of any record within the first work area 3, will complete processing.

The heavily loaded resource information record generation program 8, after the completion of the system management facility record input program 2, actuates the heavily loaded resource selection program 5 (step 82).

Figure 3:
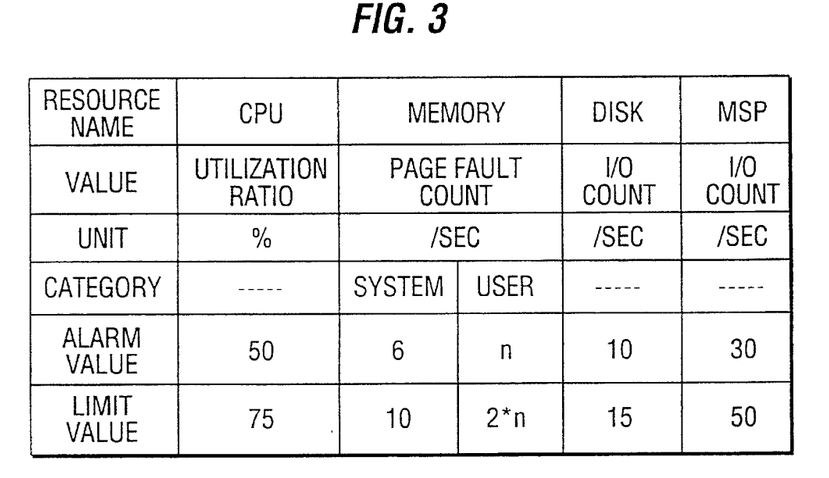
FIG. 3 is a diagram showing an example of resource utilization ratio threshold values in the resource utilization ratio threshold value file 4 of the first embodiment of the invention.

FIG. 3 shows an example of resource utilization ratio threshold values in the resource utilization ratio threshold value file 4. The resource utilization ratio threshold value file 4, which is to be set in advance of the actuation of the heavily loaded resource evaluation system, consists of the alarm value and limit value, within the performance guarantee, for the utilization ratio of each of the system resource utilization records of the system management facility file 1, more specifically the utilization ratio of the CPU, the page fault count of the memory, and the I/O counts of the disk and the MSP.

Figure 7:
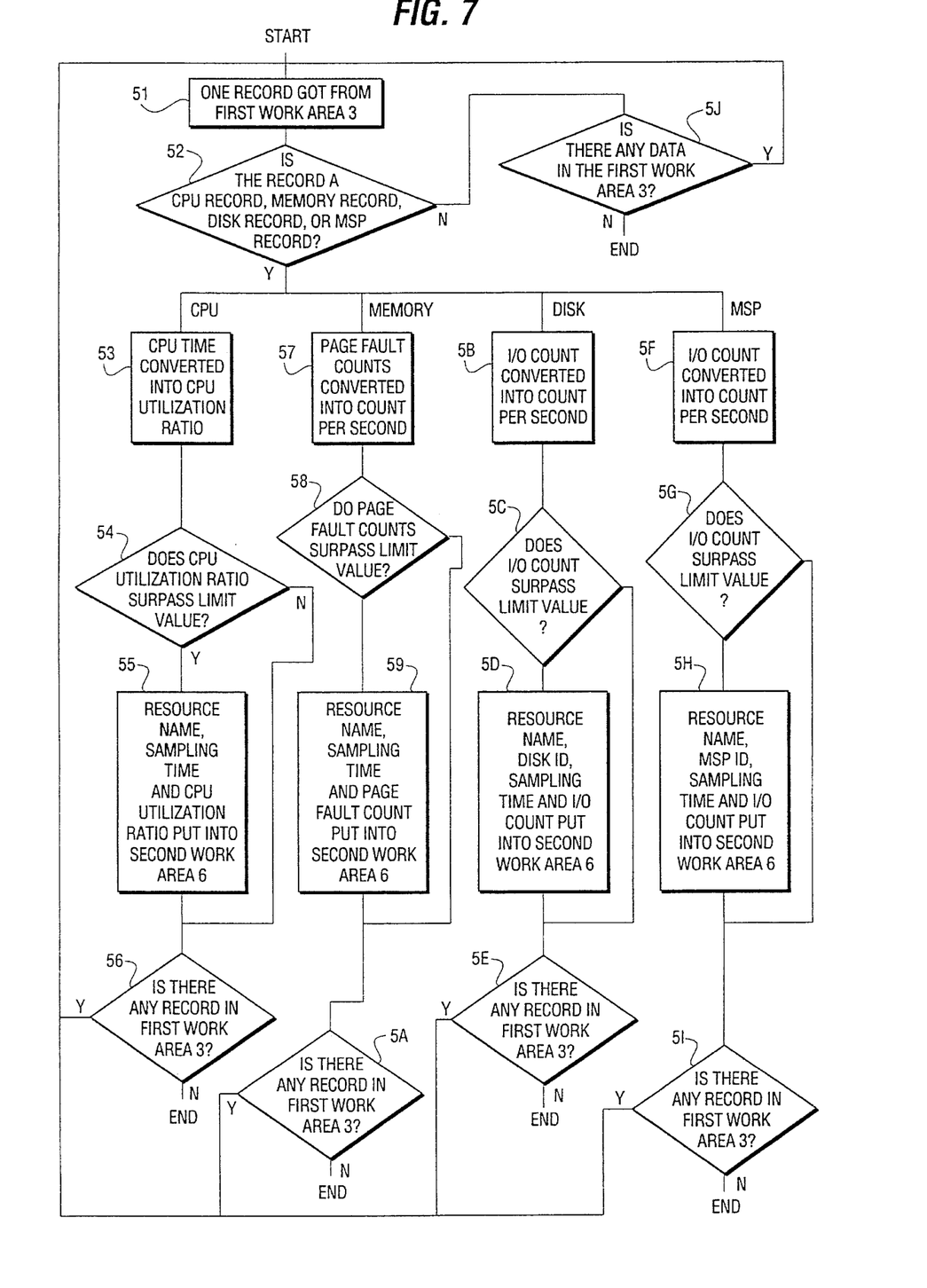
FIG. 7 is a flow chart showing the processing of the heavily loaded resource selection program 5 of the first embodiment of the invention.

The heavily loaded resource selection program 5 first gets one record from the first work area 3 (step 51, FIG. 7).

The heavily loaded resource selection program 5 determines whether the record got at step 51 is a CPU record, a memory record, a disk record or an MSP record (step 52).

The heavily loaded resource selection program 5, if it determines the record to be a CPU record at step 52, converts the CPU time of that record into a CPU utilization ratio (in %) by dividing it by the data sampling interval (step 53). Further the heavily loaded resource selection program 5 determines whether or not said CPU utilization ratio surpasses the limit value of the resource utilization ratio threshold values for the CPU in the resource utilization ratio threshold value file 4 (step 54). The heavily loaded resource selection program 5, if it determines at step 54 that the CPU utilization ratio surpasses the limit value, will put the resource name (CPU), the sampling time and the CPU utilization ratio as a single record into the second work area 6 (step 55).

The heavily loaded resource selection program 5, either if it determines at step 54 that the CPU utilization ratio does not surpass the limit value or after the completion of step 55, will determine whether or not any record is remaining in the first work area 3 (step 56). The heavily loaded resource selection program 5, if it determines at step 56 the presence of any record, will return to step 51. If it determines at step 56 that any unevaluated record is no longer remaining in the first work area 3, it will complete processing.

The heavily loaded resource selection program 5, if it determines the record to be a memory record at step 52, will convert the page fault count of the system program and that of the user program of that record into page fault counts per second by dividing them by the data sampling interval (step 57). Further the heavily loaded resource selection program 5 determines whether or not these page fault counts per second of the system program and of the user program surpass the limit value of the resource utilization ratio threshold values for the memory in the resource utilization ratio threshold value file 4 (step 58). The heavily loaded resource selection program 5, if it determines at step 58 at least either count per second surpasses the limit value, will put the resource name (memory), the sampling time, the page fault count per second of the system program and that of the user program as a single record into the second work area 6 (step 59).

The heavily loaded resource selection program 5, either if it determines at step 58 that neither the page fault count per second of the system program nor that of the user program surpasses the limit value or after the completion of step 59, will determine the presence or absence of any remaining data in the first work area 3 (step 5A). The heavily loaded resource selection program 5, if it determines at step 5A the presence of any record, will return to step 51. If it determines at step 5A that any unevaluated record is no longer remaining in the first work area 3, it will complete processing.

The heavily loaded resource selection program 5, if it determines the record to be a disk record at step 52, will convert the I/O count of that record into an I/O count per second by dividing it by the data sampling interval (step 5B). Further the heavily loaded resource selection program 5 determines whether or not this I/O count per second surpasses the limit value of the resource utilization ratio threshold values for the disk in the resource utilization ratio threshold value file 4 (step 5C). The heavily loaded resource selection program 5, if it determines at step 5C that the count per second surpasses the limit value, will put the resource name (disk), disk ID, the sampling time, and the I/O count per second as a single record into the second work area 6 (step 5D).

The heavily loaded resource selection program 5, either if it determines at step 5C that the I/O count per second does not surpass the limit value or after the completion of step 5D, will determine whether or not any record is remaining in the first work area 3 (step 5E). The heavily loaded resource selection program 5, if it determines at step 5E the presence of any record, will return to step 51. If it determines at step 5E that any unevaluated record is no longer remaining in the first work area 3, it will complete processing.

The heavily loaded resource selection program 5, if it determines the record to be an MSP record at step 52, will convert the I/O count of that record into an I/O count per second by dividing it by the data sampling interval (step 5F). Further the heavily loaded resource selection program 5 determines whether or not this I/O count per second surpasses the limit value of the resource utilization ratio threshold values for the MSP in the resource utilization ratio threshold value file 4 (step 5G). The heavily loaded resource selection program 5, if it determines at step 5G that the count per second surpasses the limit value, will put the resource name (MSP), MSP ID, the sampling time, and the I/O count per second as a single record into the second work area 6 (step 5H).

The heavily loaded resource selection program 5, either if it determines at step 5G that the I/O count per second does not surpass the limit value or after the completion of step 5H, will determine whether or not any record is remaining in the first work area 3 (step 5I). The heavily loaded resource selection program 5, if it determines at step 5I the presence of any record, will return to step 51. If it determines at step 5I that any unevaluated record is no longer remaining in the first work area 3, it will complete processing.

The heavily loaded resource selection program 5, if it determines the record to be none of a CPU record, a memory record, a disk record or an MSP record at step 52, will determine whether or not any record is remaining in the first work area 3 (step 5J). The heavily loaded resource selection program 5, if it determines at step 5J the presence of any record, will return to step 51. If it determines at step 5J that any unevaluated record is no longer remaining in the first work area 3, it will complete processing.

Figure 4:
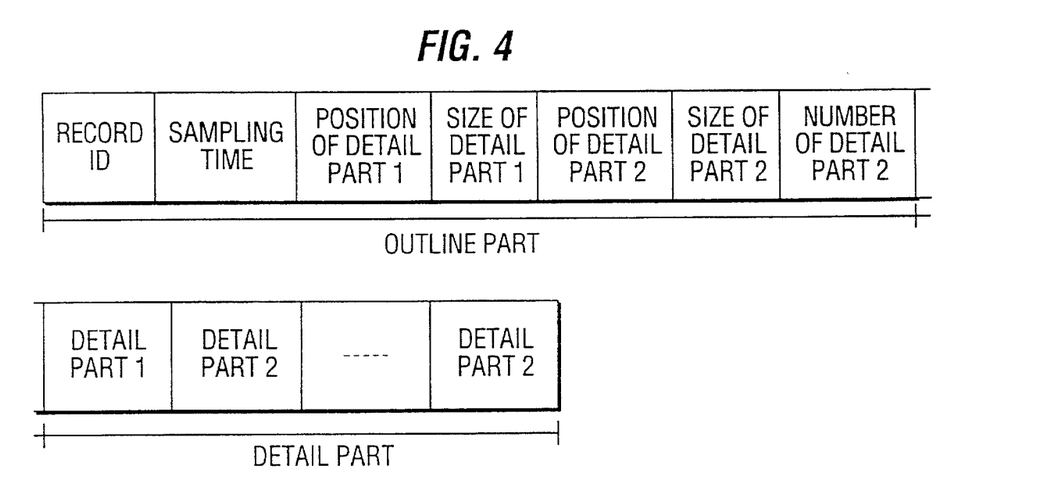
FIG. 4 is a diagram illustrating the form of heavily loaded resource information records to be stored in the heavy loaded resource information file 9 of the first embodiment of the invention.

FIG. 4 illustrates the form of heavily loaded resource information records. Of a heavily loaded resource information record, the outline part consists of the record ID, the sampling time, the position of a detail part 1, the size of the detail part 1; the positions of detail parts 2; the sizes of the detail parts 2; and the number of the detailed parts 2, and the detail parts consist of the detail part 1 and a plurality of detail parts 2. While the outline part has a fixed length, the detail parts have variable lengths, and the overall heavily loaded resource information record has a variable length.

The processing by the heavily loaded resource information record generation program 8 to generate a heavily loaded resource information record will be described below with reference to FIG. 4.

The heavily loaded resource information record generation program 8, after completion of the heavily loaded resource selection program 5, determines whether or not there is any record in the second work area 6 (step 83, FIG. 6). The heavily loaded resource information record generation program 8, if it determines at step 83 that there is no record, will complete processing.

The heavily loaded resource information record generation program 8, if it determines at step 83 the presence of any record, will sort the record or records by the sampling time (step 84).

Next, the heavily loaded resource information record generation program 8 gets one record from the second work area 6 (step 85), and refers to the resource name of that record to determine whether the record is a CPU record, a memory record, a disk record or an MSP record (step 86).

The heavily loaded resource information record generation program 8, if it determines at step 86 that the record is a CPU record, will search the first work area 3 with the sampling time of said record as the key, and gets all the job activity records at the same sampling time (step 87). The heavily loaded resource information record generation program 8 then prepares a set of data for each record, comprising a job identification number and a CPU utilization ratio calculated by dividing the CPU time by the sampling interval (step 88).

Next, the heavily loaded resource information record generation program 8, according to the form of heavily loaded resource information records illustrated in FIG. 4, first stores "CPU" into the "record ID" field of the outline part; the sampling time into the "sampling time" field; the start time of the detail part 1 into the "detail part 1's position" field; the size of CPU utilization ratio data of the CPU record into the "detail part 1's size" field; the start address of the detail parts 2 into the "detail parts 2's position" field; the size of the sets of data prepared at step 88 into the "detail parts 2's size" field; and the number of said sets of data into the "number of detail parts 2" field (step 89). The start address of the detail part 1 can be figured out as the address next to the address obtained by adding the size of the fixed-length outline part to the leading address of the heavily loaded resource information record, while that of the detail parts 2 can be figured out as the address next to the address obtained by adding the size of the detail part 1 to the start address of the detail part 1.

The heavily loaded resource information record generation program 8 further stores the CPU utilization ratio of the CPU record into the "detail part 1" field of the detail parts and the sets of data on jobs, one set by one set in the descending order of the CPU utilization ratio, into the "detail parts 2" field (step 8A), and puts the completed heavily loaded resource information record into the heavily loaded resource information file 9 (step 8B).

The heavily loaded resource information record generation program 8, after completion of step 8B, determines whether or not there is any record remaining in the second work area 6 (step 8C). The heavily loaded resource information record generation program 8, if it determines the presence of any record at step 8C, will return to step 85 or, if it determines that there is no record, will complete processing.

The heavily loaded resource information record generation program 8, if it determines at step 86 that the record is a memory record, will search the first work area 3 with the sampling time of said record as the key, get all the job activity records at the same sampling time (step 8D), and prepare a set of data for each record, comprising a job identification number and a page fault count per second calculated by dividing the page fault count by the data sampling interval (step 8E).

Next, the heavily loaded resource information record generation program 8, according to the form of heavily loaded resource information records illustrated in FIG. 4, first stores "memory" into the "record ID" field of the outline part; the sampling time into the "sampling time" field; the start time of the detail part 1 into the "detail part 1's position" field; a size calculated by adding the size of data on the page fault count per second of the system program and data on that of the user program of the memory record into the "detail part 1's size" field; the start address of the detail parts 2 into the "detail parts 2's position" field; the size of the sets of data prepared at step 8E into the "detail parts 2's size" field; and the number of said sets of data into the "number of detail parts 2" field (step 8F). The start address of the detail part 1 can be figured out as the address next to the address obtained by adding the size of the fixed-length outline part to the leading address of the heavily loaded resource information record, while that of the detail parts 2 can be figured out as the address next to the address obtained by adding the size of the detail part 1 to the start address of the detail part 1.

The heavily loaded resource information record generation program 8 further stores data on the page fault count per second of the system program and data on that of the user program of the memory record into the "detail part 1" field of the detail parts and the sets of data on jobs, one set by one set in the descending order of the page fault count per second, into the "detail parts 2" field (step 8G), and puts the completed heavily loaded resource information record into the heavily loaded resource information file 9 (step 8H).

The heavily loaded resource information record generation program 8, after completion of step 8H, determines whether or not any record is remaining in the second work area 6 (step 8I). The heavily loaded resource information record generation program 8, if it determines the presence of any record, will return to step 85 or, if it determines that there is no record, will complete processing.

The heavily loaded resource information record generation program 8, if it determines at step 86 that the record is a disk record, will first search the system configuration data in the system configuration file 7 with the media name of said record as the key, get all the file names set on said disk (step 8J), further search the first work area 3 with those file names and the sampling time of the disk record as the keys, get all the system resource utilization records in said file at the same sampling time (step 8K), and prepare a set of data for each record, comprising the file name and an I/O count per second calculated by dividing the I/O count by the sampling interval (step 8L).

Next, the heavily loaded resource information record generation program 8, according to the form of heavily loaded resource information records illustrated in FIG. 4, first stores "disk" into the "record ID" field of the outline part; the sampling time into the "sampling time" field; the start time of the detail part 1 into the "detail part 1's position" field; the size of data on the I/O count per second of the disk record into the "detail part 1's size" field; the start address of the detail parts 2 into the "detail parts 2's position" field; the size of the sets of data on the file prepared at step 8L into the "detail parts 2's size" field; and the number of said sets of data into the "number of detail parts 2" field (step 8M). The start address of the detail part 1 can be figured out as the address next to the address obtained by adding the size of the fixed-length outline part to the leading address of the heavily loaded resource information record, while that of the detail parts 2 can be figured out as the address next to the address obtained by adding the size of the detail part 1 to the start address of the detail part 1.

The heavily loaded resource information record generation program 8 further stores data on the I/O count per second of the disk record into the "detail part 1" field of the detail parts and the sets of data on the file, one set by one set in the descending order of the I/O count per second, into the "detail parts 2" field (step 8N), and puts the completed heavily loaded resource information record into the heavily loaded resource information file 9 (step 8O).

The heavily loaded resource information record generation program 8, after completion of step 8O, determines whether or not there is any record remaining in the second work area 6 (step 8P). The heavily loaded resource information record generation program 8, if it determines the presence of any record, will return to step 85 or, if it determines that there is no record, will complete processing.

The heavily loaded resource information record generation program 8, if it determines at step 86 that the record is an MSP record, will first search the system configuration data in the system configuration file 7 with the MSP name of said record as the key, get all the disks' ID connected to said MSP (step 8Q), further search the first work area 3 with those disk ID and the sampling time of the MSP record as the keys, get all the system resource utilization records of said disks at the same sampling time (step 8R), and prepare a set of data for each record, comprising the disk ID and an I/O count per second calculated by dividing the I/O count by the data sampling interval (step 8S).

Next, the heavily loaded resource information record generation program 8, according to the form of heavily loaded resource information records illustrated in FIG. 4, first stores "MSP" into the "record ID" field of the outline part; the sampling time into the "sampling time" field; the start time of the detail part 1 into the "detail part 1's position" field; the size of data on the I/O count per second of the MSP record into the "detail part 1's size" field; the start address of the detail parts 2 into the "detail parts 2's position" field; the size of the sets of data on the disks prepared at step 8S into the "detail parts 2's size" field; and the number of said sets of data into the "number of detail parts 2" field (step 8T). The start address of the detail part 1 can be figured out as the address next to the address obtained by adding the size of the fixed-length outline part to the leading address of the heavily loaded resource information record, while that of the detail parts 2 can be figured out as the address next to the address obtained by adding the size of the detail part 1 to the start address of the detail part 1.

The heavily loaded resource information record generation program 8 further stores data on the I/O count per second of the MSP record into the "detail part 1" field of the detail parts and the sets of data on the disks, one set by one set in the descending order of the I/O count per second, into the "detail parts 2" field (step 8U), and puts the completed heavily loaded resource information record into the heavily loaded resource information file 9 (step 8V).

The heavily loaded resource information record generation program 8, after completion of step 8V, determines whether or not any record is remaining in the second work area 6 (step 8W). The heavily loaded resource information record generation program 8, if it determines the presence of any record, will return to step 8S or, if it determines that there is no record, will complete processing.

At this point is completed the processing by the heavily loaded resource evaluation system, which is the operation of the first preferred embodiment of the present invention.

The heavily loaded resource evaluation system, which is the first preferred embodiment of the invention determines whether or not any of the resources constituting a computer system is subjected to a heavy load by entering system management facility records and comparing them with preset threshold values for resource utilization ratios, further identifies the name of any job or any resource which has subjected said resource to the heavy load as the bottleneck, and thereby provides the benefit of enabling any user, even if not well versed in performance evaluation procedures, to carry out performance evaluation readily and reliably.

Figure 8:
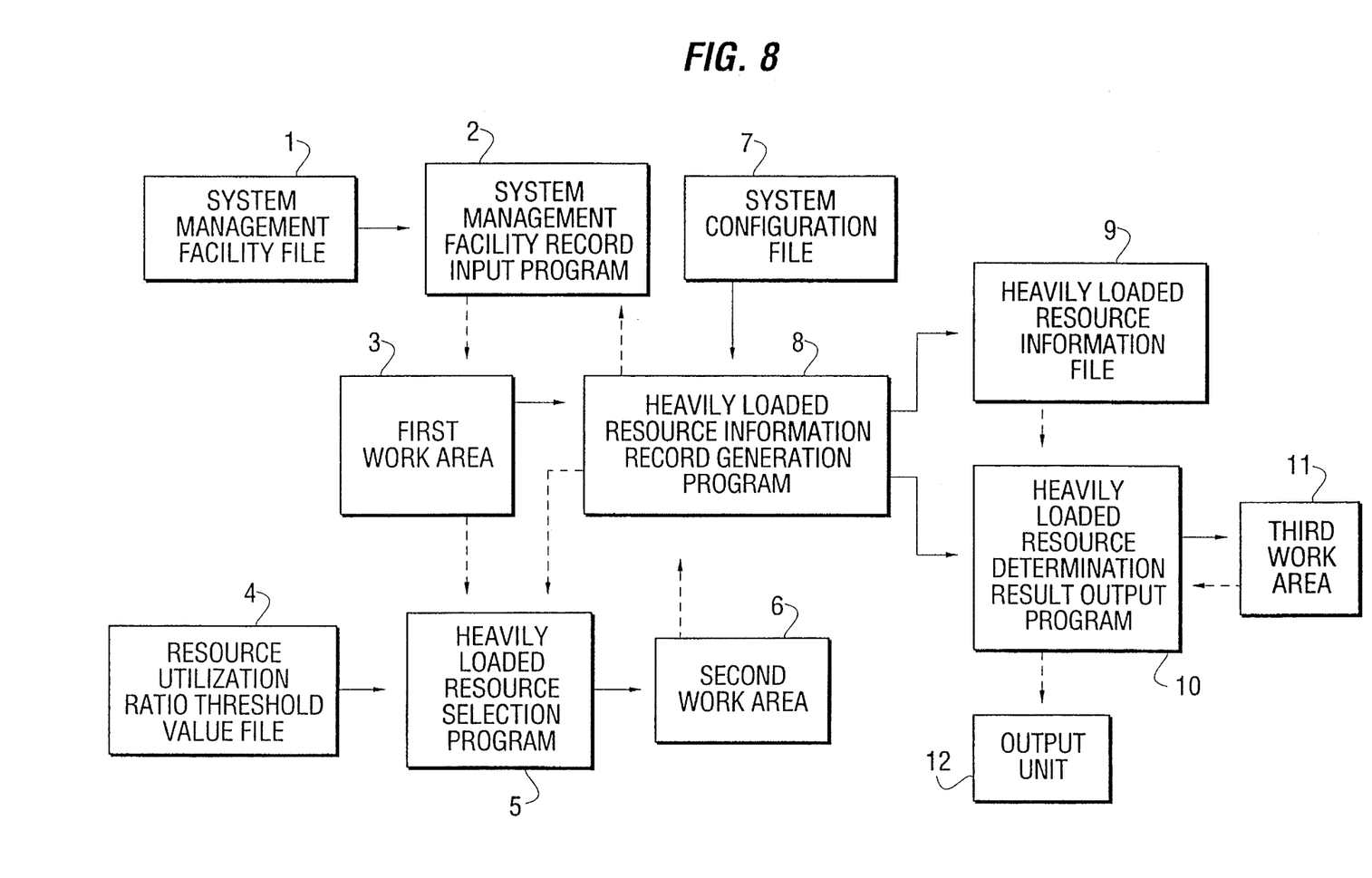
FIG. 8 is a block diagram illustrating a second preferred embodiment of the invention.

Referring to FIG. 8, another heavily loaded resource evaluation system, which is a second preferred embodiment of the present invention, has the following configuration in the heavily loaded resource evaluation system which is the first embodiment of the invention.

A heavily loaded resource determination result output program 10, actuated by the heavily loaded resource information record generation program 8, inputs heavily loaded resource information records stored in the heavily loaded resource information file 9. The heavily loaded resource determination result output program 10 edits, using a third work area 11, the utilization ratios of resources at each sampling time so as to display them in different characters with the alarm value and the limit value among the resource utilization rate threshold values in the resource utilization ratio threshold value file 4 as the boundary, and the resource utilization ratio for each job using each resource at said sampling time, or the I/O counts of each file and each disk, so as to display them arranged together with the utilization ratios of said resources, and graphically displays them on the output unit 12.

Next, the operation of this second embodiment of the invention will be described in detail with references to FIGS. 3, 4 and 8 through 10.

The heavily loaded resource information record generation program 8, after completing the generation of heavily loaded information records, actuates the heavily loaded resource determination result output program 10.

Figure 9:
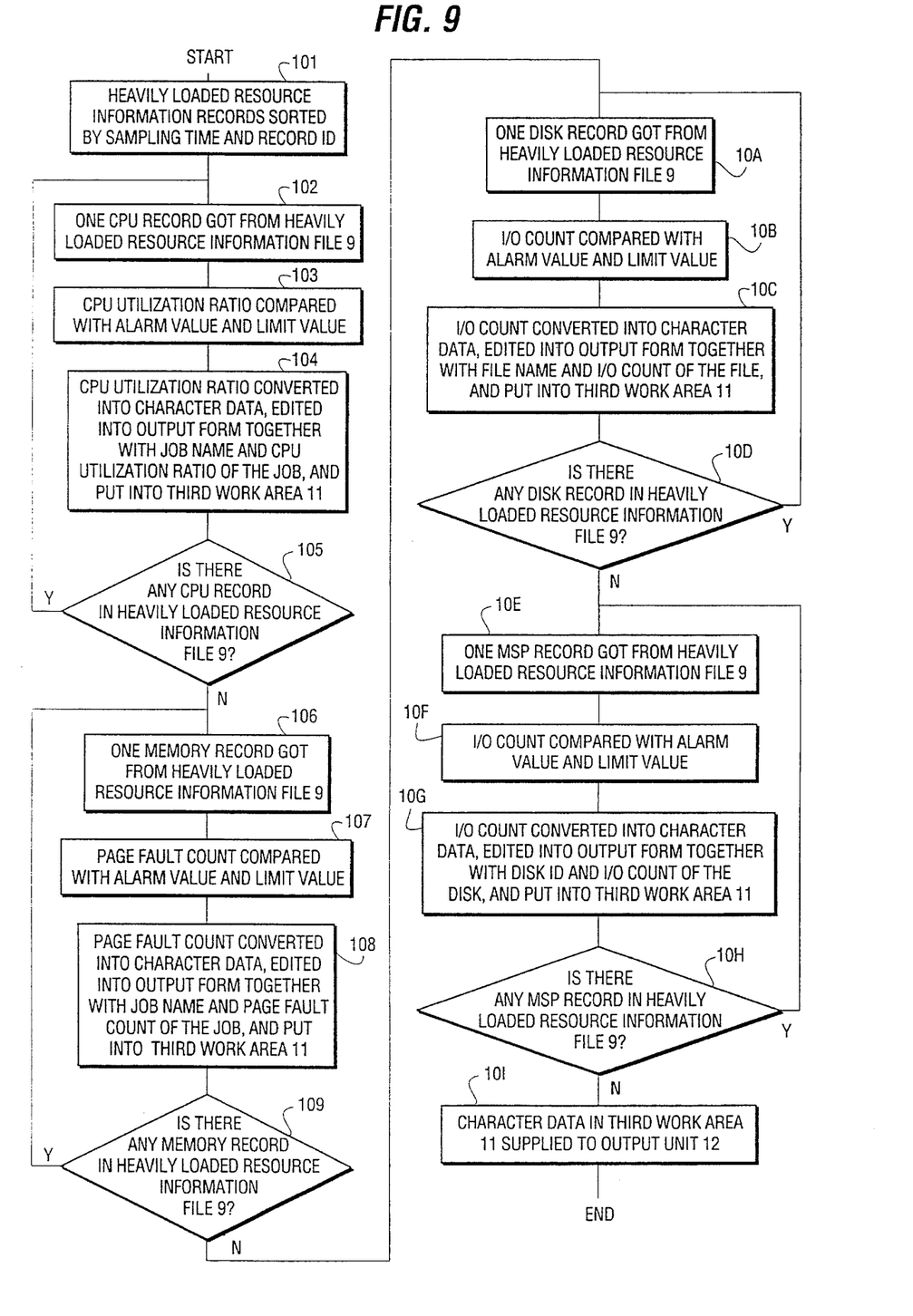
FIG. 9 is a flow chart showing the processing of the heavily loaded resource determination result output program 10 of the second embodiment of the invention.

The heavily loaded resource determination result output program 10 first sorts the heavily loaded resource information records in the heavily loaded resource information file 9 by the sampling time and the record ID (step 101).

Then the heavily loaded resource determination result output program 10 causes the record ID to get one "CPU" record (step 102). The heavily loaded resource determination result output program 10 compares the CPU utilization ratio stored in the detail part 1 of said record with the alarm value and the limit value for the CPU utilization among the threshold values for the resource utilization ratio in the resource utilization ratio threshold value file 4 (step 103). The heavily loaded resource determination result output program 10 converts the value of the CPU utilization ratio into character data, using a letter "S" if the CPU utilization ratio is between 0 and the alarm value (%), a letter "W" if it is between the alarm value and the limit value (%) or a letter "O" if it is between the limit value and 100 (%) in the result of determination at step 103; adds to it the job name stored in the detail parts 2 and the result of the conversion of said job into character data in which the CPU utilization ratio is represented by one or more "*"s; edits the sum of addition in an output form; and puts it into the third work area 11 (step 104).

The heavily loaded resource determination result output program 10, after the completion of step 104, determines whether or not there is remaining among the heavily loaded resource information records in the heavily loaded resource information file 9 a record whose record ID is "CPU" (step 105). The heavily loaded resource determination result output program 10, if it determines the presence of any such record at step 105, will return to step 102.

Next the heavily loaded resource determination result output program 10 gets one record whose record ID is "memory" (step 106). The heavily loaded resource determination result output program 10 compares the page fault count per second of the system program and that of the user program, both stored in the detail part 1 of said record, with the alarm value and the limit value for the page fault count among the threshold values for the resource utilization ratio in the resource utilization ratio threshold value file 4 (step 107). The heavily loaded resource determination result output program 10 converts the value of each page fault count into character data, using a letter "S" if the page fault count is between 0 and the alarm value (per second), a letter "W" if it is between the alarm value and the limit value (per second) or a letter "O" if it is between the limit value and 100 (per second) in the result of determination at step 107; adds to it the job name stored in the detail parts 2 and the result of the conversion of the page fault count of said job into character data in which the page fault count is represented by one or more "*"s; edits the sum of addition in an output form; and puts it into the third work area 11 (step 108).

The heavily loaded resource determination result output program 10, after the completion of step 108, determines whether or not there is remaining among the heavily loaded resource information records in the heavily loaded resource information file 9 a record whose record ID is "memory" (step 109). The heavily loaded resource determination result output program 10, if it determines the presence of any such record at step 109, will return to step 106.

Then the heavily loaded resource determination result output program 10 gets one record whose record ID is "disk" (step 10A). The heavily loaded resource determination result output program 10 compares the I/O count per second of the disk stored in the detail part 1 of said record, with the alarm value and the limit value for the disk I/O count among the threshold values for the resource utilization ratio in the resource utilization ratio threshold value file 4 (step 10B). The heavily loaded resource determination result output program 10 converts the value of each I/O count into character data, using a letter "S" if the page fault count is between 0 and the alarm value (per second) a letter "W" if it is between the alarm value and the limit value (per second) or a letter "O" if it is between the limit value and 100 (per second) in the result of determination at step 10B; adds to it the file name stored in the detail parts 2 and the result of the conversion of the I/O count of said file into character data in which the I/O count is represented by one or more "*"s; edits the sum of addition in an output form; and puts it into the third work area 11 (step 10C).

The heavily loaded resource determination result output program 10, after the completion of step 10C, determines whether or not there is remaining among the heavily loaded resource information records in the heavily loaded resource information file 9 a record whose record ID is "disk" (step 10D). The heavily loaded resource determination result output program 10, if it determines the presence of any such record at step 10D, will return to step 10A.

Next the heavily loaded resource determination result output program 10 gets one record whose record ID is "MSP" (step 10E). The heavily loaded resource determination result output program 10 compares the I/O count per second of the MSP stored in the detail part 1 of said record, with the alarm value and the limit value for the MSP I/O count among the threshold values for the resource utilization ratio in the resource utilization ratio threshold value file 4 (step 10F). The heavily loaded resource determination result output program 10 converts the value of each I/O count into character data, using a letter "S" if the page fault count is between 0 and the alarm value (per second), a letter "W" if it is between the alarm value and the limit value (per second) or a letter "O" if it is between the limit value and 100 (per second) in the result of determination at step 10F, adds to it the disk name stored in the detail parts 2 and the result of the conversion of the I/O count of said disk into character data in which the I/O count is represented by one or more "*"s; edits the sum of addition in an output form; and puts it into the third work area 11 (step 10G).

The heavily loaded resource determination result output program 10, after the completion of step 10G, determines whether or not there is remaining among the heavily loaded resource information records in the heavily loaded resource information file 9 a record whose record ID is "MSP" (step 10H). The heavily loaded resource determination result output program 10, if it determines the presence of any such record at step 10H, will return to step 10E.

The heavily loaded resource determination result output program 10, after completion step 10G, supplies the character data put into the third work area 22, to the output unit 12 (step 10I).

Figure 10:
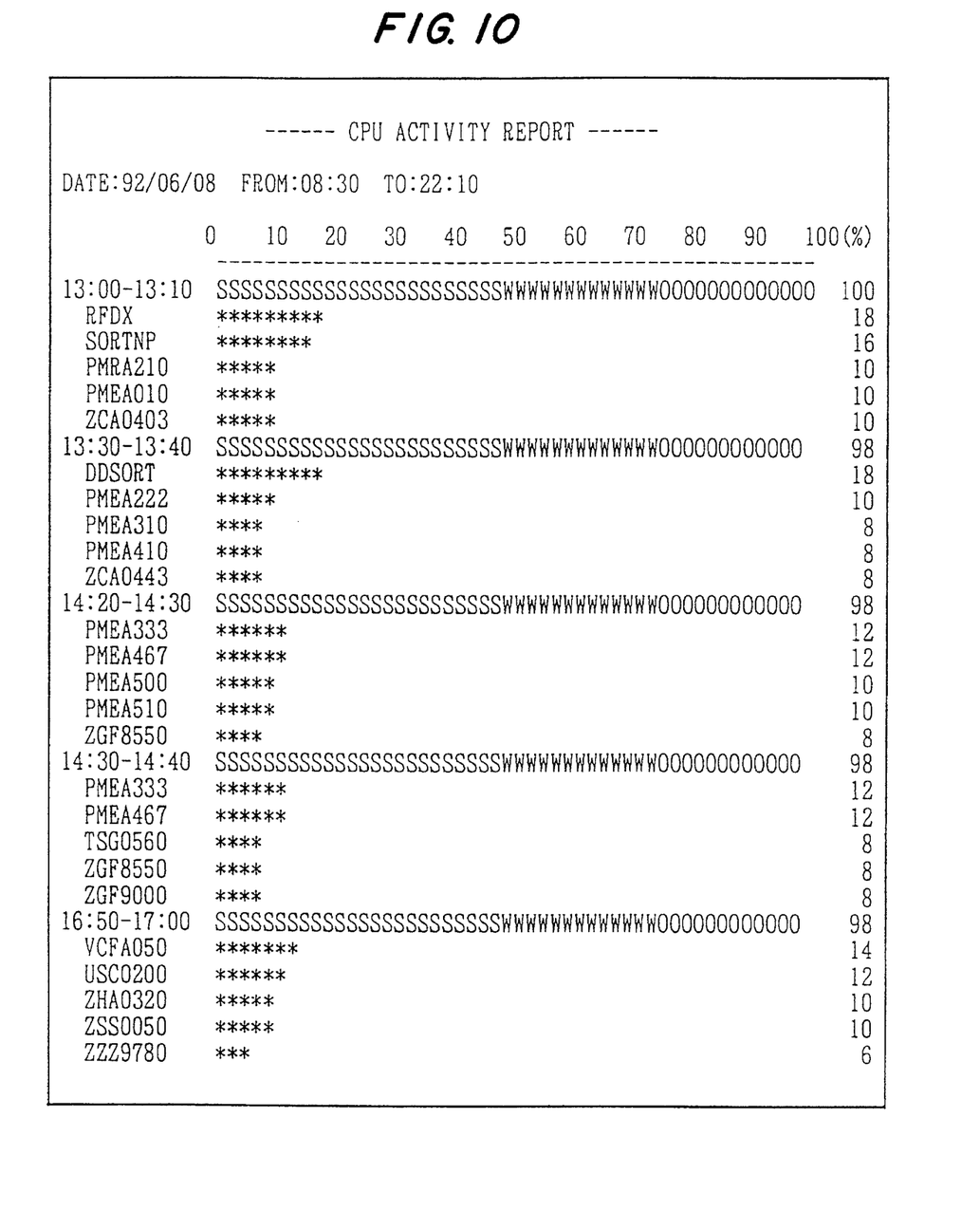
FIG. 10 is a diagram showing an example of a heavily loaded resource determination result to be supplied to the output unit 12 by the heavily loaded resource determination result output program 10 in the second embodiment of the invention.

FIG. 10 shows an example of output of CPU information. Similar outputting is possible for other resources as well.

Thus is completed the processing by the heavily loaded resource evaluation system, which is the operation of the second preferred embodiment of the present invention.

The heavily loaded resource evaluation system, which is the second preferred embodiment of the invention, determines whether or not any of the resources constituting a computer system is subjected to a heavy load by entering system management facility records and comparing them with preset threshold values for resource utilization ratios, further identifies the name of any job or any resource which has subjected said resource to the heavy load as the bottleneck, presents the result on an input/output unit to the user, and thereby provides the benefit of enabling any user, even if not well versed in performance evaluation procedures, to carry out performance evaluation readily and reliably.

Characteristic features of the present invention consist of its heavily loaded resource selection program, which compares each record in the system management facility file with threshold values for resource utilization ratios, consisting of alarm values and limit values within the performance guarantee, and extracts any resource name which fails to satisfy these values and its recorded time, and its heavily loaded resource information record generation program, which extracts the recorded time of the record extracted by this heavily loaded resource selection program, information on the names and utilization ratios of other resources recorded at the same time, and information on the name and resource utilization ratio of the job then being executed, integrates these items of information in a correlated form into single heavily loaded resource information, and outputs it to the heavily loaded source information file.

By virtue of these features, the present invention determines whether or not any of the resources constituting a computer system is subjected to a heavy load by entering system management facility records and comparing them with preset threshold values for resource utilization ratios, further identifies the name of any job or any resource which has subjected said resource to the heavy load as the bottleneck, presents the result on an input/output unit to the user, and thereby provides the benefit of enabling any user, even if not well versed in performance evaluation procedures, to carry out performance evaluation readily and reliably.

What is claimed is:

1. A heavily loaded resource evaluation system comprising:

a system management facility file, in which the status of utilization of each of a plurality of resources constituting a computer system is recorded at regular intervals as a system resource utilization record, and further an execution hysteresis of each job executed on said computer system is recorded at regular intervals as a job activity record;

a system configuration file, in which information on connective relationship between one or more external memory units which are constituent elements of said computer system and an external memory control unit for controlling said one or more external memory units and names of files stored in said one or more external memory units are stored as system configuration data;

a system management facility record input program for inputting each of said system resource utilization records and said job activity records in said system management facility file;

a resource utilization ratio threshold value file, in which an alarm value and a limit value, within a performance guarantee, for a resource utilization ratio of each of the resources constituting said computer system are stored as threshold values of the resource utilization ratio;

a heavily loaded resource selection program for comparing information on the resource utilization ratios in said system resource utilization records entered by said system management facility record input program with the limit value of the resource utilization ratio in said resource utilization ratio threshold value file, and extracting a resource name, a recorded time and the resource utilization ratio in a particular system resource utilization record indicating a heavily loaded status of utilization surpassing the limit value;

a heavily loaded resource information record generation program for extracting, after actuating said system management facility record input program and said heavily loaded resource selection program, the recorded time of said particular system resource utilization record extracted by said heavily loaded resource selection program, a job name in the job activity record entered by said system management facility record input program, information on the resource utilization ratio of each resource, and information on other resource names and information on the resource utilization ratio in said particular system resource utilization record entered by said system management facility record input program, and for further referring to the system configuration data in said system configuration file, and generating a single heavily loaded resource information record by integrating information on each resource and information on jobs using the resource, or integrating information on each resource and information on resources constituting that resource, in a correlated manner; and a heavily loaded resource information file, in which said single heavily loaded resource information record generated by said heavily loaded resource information record generation program is stored.

2. A heavily loaded resource evaluation system, as claimed in claim 1, wherein the resource utilization ratio threshold values in said resource utilization ratio threshold value file consist of preset alarm values and limit values, within the performance guarantee, for a CPU utilization ratio, a page fault count of a memory, and input/output (I/O) counts for said external memory units and said external memory control unit.

3. A heavily loaded resource evaluation system, as claimed in claim 1, wherein said heavily loaded resource information record in said heavily loaded resource information file consists of an outline part and detail parts, said outline part further consisting of a record ID indicating CPU information, memory information, external memory unit information or external memory control unit information, a sampling time, positions of said detail parts, and sizes of said detail parts, and said detail parts further consisting of an overall CPU utilization ratio and a CPU utilization ratio for each job if the record ID indicates CPU information, an overall page fault count and a page fault count for each job if the record ID indicates memory information, an overall external memory unit I/O count and an I/O count for each file in said external memory unit if the record ID indicates external memory unit information, and an overall external memory control unit I/O count and an I/O count of each external memory unit connected to said external memory control unit if the record ID indicates external memory control unit information.

4. A heavily loaded resource evaluation system, as claimed in claim 1, further provided with a heavily loaded resource determination result output program for inputting a heavily loaded resource information record stored in said heavily loaded resource information file, and graphically displaying it on an output unit.

5. A heavily loaded resource evaluation system, as claimed in claim 4, wherein the graph displayed by the heavily loaded resource determination result output program presents, besides the utilization ratios of resources, one at each recording time, represented in different characters with the alarm value and the limit value among said resource utilization rate threshold values as the boundary, the resource utilization ratio for each job using each resource at said recording time, or the I/O counts of each file and each external memory unit, all being arranged together.

6. A resource utilization system, comprising:

a computer system having a plurality of subsystems including a plurality of external memory units, an external memory control unit for controlling said external memory units, and a central processing unit (CPU);

a first memory section, a utilization ratio of each of said subsystems and a job activity record for each job executed on said computer system being written to said first memory section at regular intervals;

a second memory section storing configuration data, including information on a connective relationship between said external memory units and said external memory control unit, and the names of files stored in said external memory units;

a third memory section storing an alarm value and a unit value for each of said utilization ratios;

a first processing means for extracting said utilization ratios and said job activity records from said first memory section;

a second processing means for comparing said utilization ratios with their respective alarm values and limit values, and extracting a subsystem name, the utilization ratio, and the recorded time when one of said utilization ratios exceeds its respective limit value;

a third processing means for controlling said first and second processing means, and for extracting the recorded time from said second processing means, a job name from said job activity records and the subsystem names and utilization ratios extracted by said first processing means, referring to said configuration data in said second memory section, and for generating, in a correlated manner, a utilization record by integrating information on each subsystem and on jobs using each subsystem; and a fourth memory section connected to said third processing means, said third processing means storing said utilization record in said fourth memory section.

7. A resource utilization system as claimed in claim 6, wherein said alarm values and limit values consist of a CPU utilization ratio, a memory page fault count and input/output counts for said external memory units and said external memory control unit.

8. A resource utilization system as claimed in claim 6, wherein said utilization record consists of an outline part and detail parts, said outline part further consisting of a record ID indicating CPU information, memory information, external memory unit information or external memory control unit information, a sampling time, positions of said detail parts, and sizes of said detail parts, and said detail parts further consist of an overall CPU utilization ratio and a CPU utilization ratio for each job if the record ID indicates CPU information, an overall page fault count and a page fault count for each job if the record ID indicates memory information, an overall external memory unit I/O count and an I/O count for each file in said external memory unit if the record ID indicates external memory unit information, and an overall external memory control unit I/O count and an I/O count of each external memory unit connected to said external memory control unit if the record ID indicates external memory control unit information.

9. A resource utilization system as claimed in claim 6, further comprising: a fourth processing means for receiving said utilization record from said fourth memory section; and a display controlled by said fourth processing means, said display displaying a graphical representation of said utilization record.

10. A resource utilization system as claimed in claim 9, wherein said graphical representation includes the utilization ratios of each subsystem, within a boundary including said alarm and limit values.

11. A resource utilization system as claimed in claim 6, wherein said external memory units are disk drives and said external memory control unit is a mass storage processor.

12. A method for evaluating resource utilization in a computer system with a plurality of subsystems, including a memory, a plurality of external memory units, an external memory control unit for controlling said external memory units, and a central processing unit (CPU), comprising the steps of:

storing, at regular intervals, a utilization ratio of each of said subsystems and a job activity record for each job executed on said computer system into a first memory section of said memory;

storing configuration data, including information on a connective relationship between said external memory units and said external memory control unit, and the names of files stored in said external memory units, in a second memory section of said memory;

inputting, via a first processing means, said utilization ratios and said job activity records from said first memory section;

storing alarm values and limit values for each of said utilization ratios into a third memory section of said memory;

comparing, in a second processing means, said utilization ratios with their respective alarm values and limit values, and extracting the subsystem name, the utilization ratio, and the recorded time when one of said utilization ratios exceeds its respective limit value;

extracting the recorded time from said second processing means, a job name from said job activity records and the subsystem names and utilization ratios input by said first processing means, referring to said configuration data in said second memory section, and generating, in a correlated manner, a utilization record by integrating information on each subsystem and on jobs using each subsystem; and storing said utilization record in a fourth memory section of said memory.

13. A method for evaluating resource utilization as claimed in claim 12, further comprising inputting said utilization record from said fourth memory section into a fourth processing means and graphically displaying it on an output unit.

14. A resource utilization system, comprising:

a computer system having a plurality of subsystems including a plurality of external memory units, an external memory control unit for controlling said external memory units, and a central processing unit (CPU);

a first memory section, a utilization ratio of each of said subsystems, and a job activity record for each job executed on said computer system being written to said first memory section at regular intervals;

a second memory section storing configuration data, including information on a connective relationship between said external memory units and said external memory control unit, and the names of files stored in said external memory units;

a third memory section storing an alarm value and a unit value for each of said utilization ratios;

a first processing section, said first processing section extracts said utilization ratios and said job activity records from said first memory section;

a second processing section, said second processing section compares said utilization ratios with their respective alarm values and limit values, and extracts a subsystem name, the utilization ratio, and the recorded time when one of said utilization ratios exceeds its respective limit value;

a third processing section, said third processing section controls said first and second processing sections, and extracts the recorded time from said second processing section, a job name from said job activity records and the subsystem names and utilization ratios extracted by said first processing section, refers to said configuration data in said second memory section, said third processor section further generates, in a correlated manner, a utilization record by integrating information on each subsystem and on jobs using each subsystem; and a fourth memory section connected to said third processing section, said third processing section storing said utilization record in said forth memory section.

15. A resource utilization system as claimed in claim 14, wherein said alarm values and limit values consist of a CPU utilization ratio, a memory page fault count and input/output counts for said external memory units and said external memory control unit.

16. A resource utilization system as claimed in claim 14, wherein said utilization record consists of an outline part and detail parts, said outline part further consisting of a record ID indicating CPU information, memory information, external memory unit information or external memory control unit information, a sampling time, positions of said detail parts, and sizes of said detail parts, and said detail parts further consist of an overall CPU utilization ratio and a CPU utilization ratio for each job if the record ID indicates CPU information, an overall page fault count and a page fault count for each job if the record ID indicates memory information, an overall external memory unit I/O count and an I/O count for each file in said external memory unit if the record ID indicates external memory unit information, and an overall external memory control unit I/O count and an I/O count of each external memory unit connected to said external memory control unit if the record ID indicates external memory control unit information.

17. A resource utilization system as claimed in claim 14, further comprising: a fourth processing section, said fourth processing section receives said utilization record from said fourth memory section; and a display controlled by said fourth processing section, said display displaying a graphical representation of said utilization record.

18. A resource utilization system as claimed in claim 17, wherein said graphical representation includes the utilization ratios of each subsystem, within a boundary including said alarm and limit values.

\* \* \* \* \*